Patented July 31, 1945

2,380,847

UNITED STATES PATENT OFFICE 2,380,847

METHOD OF PRODUCING OIL FROM OIL-BEARING MATERIALS

Charles W. Kaufman, Hasbrouck Heights, N. J., assignor to General Seafoods Corporation, Boston, Mass., a corporation of Massachusetts No Drawing. Application May 26, 1942, Serial No. 444,584

10 Claims. (Cl. 195—3)

This invention relates to the recovery or production of high quality oil from oil-bearing protein material of animal origin, and is described hereinafter with particular reference to the livers, viscera, and meat of fish for purposes of illustration. It will be understood, however, that the invention is not restricted to this particular use.

When strictly fresh oil-bearing material such as fish livers or meat is rendered, the oil produced is very low in free fatty acids, light in color and free from objectionable odor and taste. If, on the other hand, such raw material is allowed to stand for even a short time before rendering, decomposition sets in with the result that the recovered oil contains a high percentage of objectionable free fatty acids and is dark in color, of offensive odor and taste, and difficult to render. U. S. P. specifications permit only small amounts of free fatty acids in such oils, and since depth of color of the oil is usually indicative of high free fatty acid content, light oils bring higher prices than dark colored oils. If the amount of free fatty acid does not exceed about 10%, it can be removed from the oil during processing without greatly increasing production costs. However, loss of oil and production difficulties make it impracticable to remove more than 10% free fatty acid, and oil containing more than this amount must usually be saponified and used for the preparation of vitamin concentrates.

The changes which take place in fish livers and the like on standing result in part from putrefactive decomposition caused by bacteria, but are also due in large part to the action of digestive enzymes, especially proteases and fat-splitting lipases. Even under bacteriologically sterile conditions these enzymes digest the excised livers so that a fluid mixture of decomposed proteins and fatty acids results within a few days. The oil or fat is largely enclosed within the protein tissues of the liver so that the protein-splitting properties of the proteases and the accompanying digestion of the tissues are desirable to release it. However, the lipases ruin the fat for use except for soap or the preparation of vitamin concentrates.

Hence oil meeting the rigid U. S. P. specifications for taste, odor, color, and low free fatty acid content can be produced only when the livers are removed from the fish very promptly after the fish are caught, and are rendered within a few hours after their removal. Thus in Norway, because of the near-shore location of the fishing banks, cod livers are rendered at shore plants within a few hours after the catch is made and a very high quality oil is produced, much of which has been eventually imported into this country for pharmaceutical purposes. In the case of United States fisheries, however, the fishing banks are remote and prompt handling of the livers between ship and shore is physically impossible in most cases. High quality oil can be obtained by prompt rendering aboard ships, but only under cramped conditions involving excessive operating costs, low yields, and serious storage problems, all of which have hampered the development of a domestic fish liver oil industry. Chemical preservatives such as alcohol in high concentration, formaldehyde, etc., can be used to prevent decomposition until shore is reached, but they coagulate the protein and harden the tissues, increase the difficulty of recovering the oil, and result in low yields.

Accordingly one of the objects of the present invention is to make it possible to hold such oil-bearing material in storage for prolonged periods, say several weeks or more if desired, while substantially preventing deterioration of the oil and avoiding at the same time the production difficulties and loss of oil which have heretofore resulted from the use of preservatives.

Another object is to inhibit or prevent bacterial decomposition and the fat-splitting action of the lipases and at the same time to permit proteolytic digestion of the tissues to proceed during storage of the oil-bearing material, thereby releasing and facilitating the recovery of a high quality oil.

A further object is to provide a simple and inexpensive but effective and practical method of treating and handling oil-bearing materials such as fish livers whereby, after storage for desired periods, the oil can be recovered by simple separation of the oil and water phases of a liquid mixture.

A still further object is to provide a method of accomplishing the above results without detriment to the vitamin potency or the color, flavor or odor of the oil eventually recovered from the material.

I have found that when the oil-bearing protein material is mixed with an aqueous mixture of alcohol, the overall alcohol content being not less than 3% nor more than 12% by weight of the entire mixture, the development of free fatty acids is substantially prevented, while at the same time the tissues are slowly digested so that there is general disintegration of the cell structure of the entire raw material, leading to liquefaction of the livers and complete release of all the oil. It appears that these results are due, at least in large part, to inactivation or inhibition of the lypolytic enzymes under the above conditions without interfering on the other hand with the digestive action of the proteolytic enzymes. In effect, the limitation of alcohol concentration to this range thus may be said to result in fractional inactivation of the enzymes, depressing the activity of the undesirable types without destroying the action of the desirable ones. The degree of this fractional inactivation varies somewhat with the concentration of alcohol within the range specified; with fish livers, for example, the inactivation of lipases, as indicated by the fatty acid content, occurs at 4.0% alcohol after they have produced about 7-9% free fatty acid while at 8.5% alcohol equilibrium is attained at about 2-3% free fatty acid. Proteolytic action, however, goes on in both cases as indicated by digestion of tissues and liberation of the oil. Moreover, the pH of the mixture can be adjusted when desired to increase the rate of tissue digestion without interfering with the apparent inhibition or inactivation of the lipases, for example, by the addition of suitable acid-reacting materials. Acetic and similar acids may be used conveniently for this purpose, but other more highly ionized acids would function equally as well. On the other hand, at alcohol concentrations of about 12% or above, the proteolytic enzymes are also inactivated as indicated by the absence of digestion.

Although such low concentrations of alcohol are not regarded as possessing any appreciable germicidal activity, I have found that when the alcohol content of the mixture is from 6% to 12% on the basis explained above, such mixtures may be kept for months without any apparent bacterial activity. The absence of bacterial action may be peculiar to mixtures of the type described above, but in any event there is no evidence of bacterial decomposition even long after tissue digestion is complete. If the alcohol content is from 3% to 6% significant protection is obtained but to a less marked degree, and it is preferable to add a small amount of a suitable germicide to the mixture. Any suitable water-soluble germicide can be used for this purpose, for example, acetic, propionic, or any other free fatty acid up to and including capric acid, borax, sodium benzoate, sodium salicylate, bromphenolic acid, chlor-acetic acid, sodium arsenate, etc. Acid-reacting materials are usually preferred, however, because they shift the pH of the solution toward the acid side to promote tissue digestion as explained above. I have observed, for example, that a solution composed of not less than 0.25% acetic acid and 3-6% alcohol, each as overall concentrations, possesses satisfactory germicidal properties, but higher concentrations of acid have no deleterious effect.

In making up solutions for the above purposes, any desired alcohol can also be used, such as ethyl, isopropyl, butyl, amyl, etc., and when desired any suitable germicide such as those mentioned above can be added. In general, however, common non-toxic food ingredients are desirable, and in most cases ethyl and isopropyl alcohol are preferred because of their low boiling points and low solubility in the oil while acetic and propionic acids are preferred because of their relatively high volatility. Moreover, these preferred materials are desirable because of the ease with which they can be obtained, their relative cheapness, and the fact that they introduce no toxic or difficult removal problems in the eventual processing of the oil.

In practice I prefer to prepare solutions containing not more than 35% alcohol, which are non-corrosive and permit of efficient and economical storage, and to add about two parts of raw material for each one part of solution, the exact amount depending on the overall concentration of alcohol within the above range which it is desired to reach. By this technique the raw material may be added either in small portions or all at one time, without affecting the eventual digestion of the material and the release of the oil contained therein. However, the practice of the invention is not limited to this procedure. The only limiting factors are that the fish livers or other material are brought into effective contact with the solution in order to permit diffusion between livers and preservative, and that the overall concentration of the alcohol is not less than 3% nor more than 12%. For example, if the size of the livers is reduced by grinding or otherwise the ease of dispersion of the alcohol is increased, and with an initial alcohol concentration of about 35%, as much as five parts of ground livers can be added for one part of solution without introducing any spoilage hazard, assuming that the ground livers are sufficiently agitated to prevent their floating above the preservative.

One of the important practical advantages of my invention is that substantially complete recovery of the oil from the livers can be effected simply by separating the oil and water phases of the liquid mixture, as by decantation, siphoning, centrifuging, or other simple operation familiar to those skilled in the art. The livers may be left in the solution until complete cellular digestion has taken place, and on standing, the clear oil rises to the top and can be readily removed. When this procedure is followed, yields of 58–62% of crude oil are common as compared with 40–45% where other preservatives are used which do not permit digestion. The free fatty acid content of the crude oil depends to some extent upon the composition of the preserving solution, but is at all times held below the point where soap formation and emulsification would make subsequent processing costly and difficult. Hence free fatty acids can easily be removed or reduced within permissible limits, and the yield of refined oil is at least equal to that obtained when the livers are rendered immediately after the fish are caught. Moreover, no deleterious effect on the desirable flavor, color, odor, vitamin potency and other good qualities of the oil can be observed.

The following detailed examples illustrate the practical application of the invention, but it is to be expressly understood that said examples are for purposes of illustration only and are not to be taken as a definition of the limits of the invention, reference being had to the appended claims for this purpose.

*Example 1*

A preserving solution was prepared as follows:

|  | Pounds | Per cent |
| --- | --- | --- |
| Alcohol, ethyl | 1.4 | 10 |
| 10% white vinegar | 1.4 | [1] 1 |
| Water | 11.2 | 89 |
|  | 14.0 | 100.0 |

[1] As acetic.

28 pounds of fresh cod livers were added to the above 14 pounds of preserving solution, and the entire mixture was allowed to stand in a five gallon can for 38 days at 70° F. At the end of this period, the livers were fully digested and the oil had risen to the top. The mixture was sweet smelling and fresh. Without further treatment the five gallons of liver-preservative mixture were passed through a high speed Sharples centrifuge to recover the crude oil, which was then refined simply by neutralizing the free fatty acid with sodium hydroxide and permitting the soap to settle. The soap stock was siphoned from the oil, the oil washed with several water treatments and then dried by filtering through a bed of sodium sulfate. The refined oil was sweet smelling, light yellow in color, and contained less than 0.1% free fatty acid.

Analytical data for the test is shown below and compared with similar data taken on the original livers before preservation. Unpreserved livers stored for the same period of time were too spoiled to make an oil extraction feasible.

|  | Fresh livers | Preserved livers |
|---|---|---|
| Livers: |  |  |
| Volatile nitrogen (NH₃) | 0.02% | 0.06%. |
| Odor | Fresh | Fresh. |
| Crude oil: |  |  |
| Yield | 53.5% | 61%. |
| Free fatty acid (oleic) | 0.5% | 9%. |
| Color of oil | Light yellow | Deep yellow. |
| Vitamin A (I. U.) | 3,300 | 3,300. |
| Refined oil: |  |  |
| Yield | 53.5% | 53.5%. |
| Free fatty acid (oleic) | 0.5% | 0.5%. |
| Color of oil | Light yellow | Light yellow. |
| Vitamin A (I. U.) | 3,300 | 3,300. |

*Example 2*

A preserving solution was prepared as follows:

|  | Pounds | Per cent |
|---|---|---|
| Alcohol, isopropyl | 2.8 | 20 |
| Water | 11.2 | 80 |
|  | 14.0 | 100 |

28 pounds of pollock livers were placed in the preserving solution and permitted to stand at 70° F. for three weeks. At the end of this time the livers were thoroughly digested and the oil had risen to the surface. The pH of the mixture was brought to 9.0 by the addition of sodium hydroxide and the mix heated to a boil. It was then permitted to stand for 60 minutes, during which time a very clean separation of oil and water took place. The oil was siphoned from the surface, 16 pounds of oil being recovered in this manner. A subsequent analysis showed that over 98% of the total available oil was recovered by this simple separation technique. The oil was light yellow, and except for filtration required no further treatment.

Analytical data on the sample was as follows:

Livers (preserved): Volatile nitrogen (NH₃) _____ per cent__ 0.053
Oil:
   Yield _____do____ 57.0
   Free fatty acid (before extraction) _____per cent__ 2.9
   Free fatty acid (after extraction) _____per cent__ 0.25
   Color _____ light yellow

*Example 3*

A preserving solution was prepared as follows:

|  | Pounds | Per cent |
|---|---|---|
| Alcohol, ethyl | 2.8 | 40.0 |
| Propionic acid | 0.2 | 2.9 |
| Water | 4.0 | 57.1 |
|  | 7.0 | 100.0 |

The above 7 pounds of preserving solution were intimately mixed with 35 pounds of comminuted cod fish livers and the mixture stored for three weeks at 70° F. At the end of this period, the oil was removed and refined by the process described in Example I. The free fatty acid content of the oil before refining was 3.6% and after refining only 0.25%. The yield of refined oil was 55%. Although the concentration of alcohol in the solution was 40%, the actual weight of alcohol was only 2.8 pounds or 6.67% of the total mix. This example represents a special case such as mentioned above in which, because of the comminution of the material, it was possible to use a more concentrated preservative without fear of unequal distribution.

It will be evident that the present invention makes it possible to treat the fresh raw oil-bearing material immediately, from whatever source it may be obtained, and then to defer recovery of the oil therefrom for extended periods without loss in quality of the oil due to chemical and physical changes during the storage period, and without loss in quality or yield of oil due to any reaction of the preservative on the oil or the protein material carrying the oil. On the other hand, the digestion of the protein material releases the oil and makes possible the recovery of a high yield of high quality oil by simple separation of the oil and water phases of the mixture. Most of the undesirable qualities found in low grade oils may be traced directly to bacterial or enzymatic decomposition of the oil or the raw material from which it is extracted. Such changes can be halted in whole or in part by the addition of germicides and preservatives such as formaldehyde, acetaldehyde, or alcohol in sufficient concentration to coagulate the protein tissues and inactivate the tissue enzymes, but the tissues are shrunken and hardened and the oil, which is enclosed within the coagulated cell walls, can only be removed by complex processing and then usually with a considerable loss in yield. Thus fish livers preserved in alcohol solution where the overall concentration is greater than 12% or in formaldehyde and like preservatives, and then rendered by methods common to the oil rendering industry, will yield only 40–45% by weight of oil in contrast to 58–62% yields by my process.

Whereas reduction in the concentration of formaldehyde and the like merely introduces the hazard of possible spoilage, without compensating advantages, reduction in the concentration of alcohol to within the range specified above provides a medium possessing ideal properties to a very high degree. That is, the process not only preserves the material by preventing the development of putrefaction or mold and inhibiting the fat-splitting action of lipolytic enzymes, but also does not harden or coagulate the tissues but instead promotes proteolytic digestion to release the oil from the tissues and facilitate its recovery without deleterious effect on its vitamin potency, and without detriment to its eventual color, odor and taste. At the same time the treating medium is characterized by relatively high insolubility in the oil, relatively easy removability from the oil during refining, non-toxicity to humans and animals, non-corrosive action on tanks and containers, and ready availability at reasonable cost.

It will be understood that the invention is not restricted to the details and particular examples set forth above, as many variations are possible and will be apparent to those skilled in the art without departing from its spirit. Reference should therefore be had to the appended claims for a definition of the limits of the invention.

What is claimed is:

1. A process of producing oil from oil-bearing protein material of animal origin which is normally subject to relatively rapid spoilage, which comprises forming an aqueous mixture of the fresh raw material with alcohol, the concentration of alcohol being not more than 12% nor less than 3% by weight of the mixture, storing the mixture until substantial digestion of said material has taken place, and then recovering the oil from said mixture.

2. A process of producing oil from oil-bearing protein material of animal origin which is normally subject to relatively rapid spoilage, which comprises forming an aqueous mixture of the fresh raw material with ethyl alcohol, the concentration of alcohol being not more than 12% nor less than 3% by weight of the mixture, storing the mixture until substantial digestion of said material has taken place, and then recovering the oil from said mixture.

3. A process of producing oil from oil-bearing protein material of animal origin which is normally subject to relatively rapid spoilage, which comprises forming an aqueous mixture of the fresh raw material with isopropyl alcohol, the concentration of alcohol being not more than 12% nor less than 3% by weight of the mixture, storing the mixture until substantial digestion of said material has taken place, and then recovering the oil from said mixture.

4. A process of producing oil from oil-bearing protein material of animal origin which is normally subject to relatively rapid spoilage, which comprises forming an aqueous mixture of the fresh new material with alcohol and a water-soluble germicide other than alcohol, the concentration of alcohol being not more than 12% nor less than 3% by weight of the mixture, storing the mixture until substantial digestion of said material has taken place, and then recovering the oil from said mixture.

5. A process of producing oil from oil-bearing protein material of animal origin which is normally subject to relatively rapid spoilage, which comprises forming an aqueous mixture of the fresh raw material with alcohol and a water-soluble germicide other than alcohol, the concentration of alcohol being not more than 6% nor less than 3% by weight of the mixture, storing the mixture until substantial digestion of said material has taken place, and then recovering the oil from said mixture.

6. A process of producing oil from oil-bearing protein material of animal origin which is normally subject to relatively rapid spoilage, which comprises forming an aqueous mixture of the fresh raw material with alcohol and acetic acid, the concentration of alcohol being not more than 12% nor less then 3% by weight of the mixture, storing the mixture until substantial digestion of said material has taken place, and then recovering the oil from said mixture.

7. A process of producing oil from oil-bearing protein material of animal origin which is normally subject to relatively rapid spoilage, which comprises forming an aqueous mixture of the fresh raw material with alcohol and propionic acid, the concentration of alcohol being not more than 12% nor less than 3% by weight of the mixture, storing the mixture until substantial digestion of said material has taken place, and then recovering the oil from said mixture.

8. A process of producing oil from oil-bearing protein material of animal origin which is normally subject to relatively rapid spoilage, which comprises forming an aqueous mixture of the fresh raw material with ethyl alcohol and acetic acid, the concentration of ethyl alcohol being not more than 12% nor less than 3% by weight of the mixture, storing the mixture until substantial digestion of said material has taken place, and then recovering the oil from said mixture.

9. A process of producing oil from oil-bearing protein material of animal origin which is normally subject to relatively rapid spoilage, which comprises forming an aqueous mixture of the fresh raw material with liquid alcohol and a material reacting acid in solution to accelerate tissue digestion of said material, the concentration of alcohol being not more than 12% nor less than 3% by weight of the mixture, storing said mixture until substantial digestion of said material has taken place, and then recovering the oil from said mixture.

10. A process of producing oil from oil-bearing protein material of animal origin which is normally subject to relatively rapid spoilage, which comprises forming an aqueous mixture of the fresh raw material with isopropyl alcohol and acetic acid, the concentration of isopropyl alcohol being not more than 12% nor less than 3% by weight of the mixture, storing the mixture until substantial digestion of said material has taken place, and then recovering the oil from said mixture.

CHARLES W. KAUFMAN.